(12) United States Patent
Davies et al.

(10) Patent No.: US 12,214,296 B2
(45) Date of Patent: *Feb. 4, 2025

(54) SAMPLE CLEAN UP METHOD (71) Applicant: Biotage AB, Uppsala (SE)

(72) Inventors: Geoff Davies, Newport (GB); Adam Senior, Cardiff (GB); Lee Williams, Newport (GB); Rhys Jones, Torfaen (GB)

(73) Assignee: Biotage AB, Uppsala (SE)

( * ) Notice: Subject to any disclaimer, the term of this patent is extended or adjusted under 35 U.S.C. 154(b) by 105 days.

This patent is subject to a terminal disclaimer.

(21) Appl. No.: 18/165,246

(22) Filed: Feb. 6, 2023

(65) Prior Publication Data
US 2023/0191281 A1 Jun. 22, 2023

Related U.S. Application Data (63) Continuation of application No. 16/642,474, filed as application No. PCT/SE2018/051053 on Oct. 17, 2018, now Pat. No. 11,617,968.

(30) Foreign Application Priority Data

Oct. 18, 2017 (EP) .................................. 17197060

(51) Int. Cl.
*B01D 15/12* (2006.01)
*B01D 15/20* (2006.01)
(Continued)

(52) U.S. Cl.
CPC .......... *B01D 15/125* (2013.01); *B01D 15/20* (2013.01); *B01J 20/04* (2013.01); *B01J 20/08* (2013.01);
(Continued)

(58) Field of Classification Search
CPC ........ B01D 15/125; B01D 15/20; B01J 20/04; B01J 20/08; B01J 20/103; B01L 3/02;
(Continued)

(56) References Cited

U.S. PATENT DOCUMENTS 5,585,070 A 12/1996 Lessard et al.
6,541,273 B1 4/2003 Plaisance
(Continued)

FOREIGN PATENT DOCUMENTS

CN 104749305 A 7/2015
JP 2001-330598 A 11/2001
(Continued)

OTHER PUBLICATIONS

Plossl, F., et al., "Multiresidue analytical method using dispersive solid-phase extraction and gas chromatography/ion trap mass spectrometry to determine pharmaceuticals in whole blood", Journal of Chromatography A, 1135, pp. 19-26. (Year: 2006).*
(Continued)

*Primary Examiner* — Benjamin L Lebron
(74) *Attorney, Agent, or Firm* — Harness, Dickey & Pierce, P.L.C.

(57) ABSTRACT

The present invention relates to a flow-through device comprising at least one separation column wherein a first packing component, which comprises particles of alumina and/or silica, and a second packing component, which comprises a powder of one or more hygroscopic salts are provided. The two packing components may be blended or layered in the device, which may comprise a single tube or a plurality of tubes arranged in a plate format, such as the wells of a multiwall plate or tubes in a rack. In addition, the invention relates to a method for removing one or more matrix components, such as pigments, from a biological sample, by passing said sample across a first packing com-
(Continued)

ponent, which comprises particles of alumina and/or silica, and a second packing component, which comprises a powder of one or more hygroscopic salts.

20 Claims, 9 Drawing Sheets

(51) Int. Cl.
| | | |
|---|---|---|
| | *B01J 20/04* | (2006.01) |
| | *B01J 20/08* | (2006.01) |
| | *B01J 20/10* | (2006.01) |
| | *B01J 20/281* | (2006.01) |
| | *B01J 20/283* | (2006.01) |
| | *B01J 20/284* | (2006.01) |
| | *B01J 20/286* | (2006.01) |
| | *B01L 3/02* | (2006.01) |
| | *G01N 1/40* | (2006.01) |
| | *G01N 30/52* | (2006.01) |
| | *G01N 30/60* | (2006.01) |

(52) U.S. Cl.
CPC .......... *B01J 20/103* (2013.01); *B01J 20/281* (2013.01); *B01J 20/283* (2013.01); *B01J 20/284* (2013.01); *B01J 20/286* (2013.01); *B01L 3/02* (2013.01); *G01N 1/405* (2013.01); *G01N 30/52* (2013.01); *G01N 30/6069* (2013.01); *B01L 2300/0681* (2013.01); *B01L 2300/069* (2013.01); *B01L 2300/0832* (2013.01)

(58) Field of Classification Search
CPC ......... B01L 2300/681; B01L 2300/069; B01L 2300/0832; G01N 1/405; G01N 30/482; G01N 30/52; G01N 30/6069
See application file for complete search history.

(56) References Cited

U.S. PATENT DOCUMENTS

| | | |
|---|---|---|
| 2007/0102358 A1 | 5/2007 | Good |
| 2007/0264724 A1 | 11/2007 | Shelly et al. |
| 2010/0258494 A1 | 10/2010 | Freudenschuss et al. |

FOREIGN PATENT DOCUMENTS

| | | |
|---|---|---|
| JP | 2009-507620 A | 2/2009 |
| WO | WO-2007030847 A1 | 3/2007 |
| WO | WO-2008103828 A1 | 8/2008 |
| WO | WO-2012/007502 A1 | 1/2012 |

OTHER PUBLICATIONS

International Search Report PCT/ISA/210 for International Application No. PCT/SE2018/051053 dated Dec. 18, 2018.
Wen Y. et al. (2012) "Molecularly imprinted matrix solid-phase dispersion coupled to micellar electrokinectic chromatography for simultaneous determination of triazines in soil, fruit, and vegetable samples" In: Electrophoresis vol. 33, pp. 2454-2463.; Section 2.5; Figure S1 supplementary data; p. 2455 lines 16-20.
Agilient® QuEChERS Selection guide (2011) [online] [retrieved on Dec. 12, 2018] Retrieved from the Internet: <URLhttps://www.agilent.com/cs/library/selectionguide/Public/5990-8590EN.pdf>; p. 7, part No. 5982-4921.
Usui K. et al. (2012) "Rapid determination of disulfoton and its oxidative metabolites in human whole blood and urine using QuEChERS extraction and liquid chromatography-tandem mass spectrometry" In: Legal Medicine, vol. 14, Issue 6, pp. 309-316.; Section 2.3.
Analytical Sample Preparation, 2014 catalog, Biotage® [online] [retreived on Dec. 12, 2018] Retrieved from the Internet: <URL:http://www.symta.com/descargas/CATALOGO%20BIOTAGE%20SAMPLE%20PREPARATION%202014.pdf>; p. 21, Isolute C18; p. 35, Isolute Layered SPE Columns; p. 47 Isolute Sodium Sufate Drying Cartridges.
European Search Report dated Apr. 30, 2018 issued in corresponding European Application No. 17197060.1.
Database WPI, Week 201567, Thomson Scientific, London, GB, 2015-52217Y, XP002780013 & CN 104749305.
Office Action issued Oct. 18, 2022 in Japanese Application No. 2020-522036.
Rejczak, T., and T. Tuzimski, "A review of recent developments and trends in the QuEChERS sample preparation approach," Open Chem., 13:980-1010 (Year, 2015).
Olsen, B., "Hydrophilic interaction chromatography using amino and silica columns for the determination of polar pharmaceuticals and impurities," Journal of Chromatography A, 913, pp. 113-122 (year, 2001).
Non-Final Office Action issued Aug. 3, 2022 in U.S. Appl. No. 16/642,474.
Notice of Allowance issued Nov. 23, 2022 in U.S. Appl. No. 16/642,474.

* cited by examiner

SAMPLE CLEAN UP METHOD

CROSS-REFERENCE TO RELATED APPLICATIONS

This application is a Continuation Application of U.S. application Ser. No. 16/642,474, filed on Feb. 27, 2020, which is a national phase under 35 U.S.C. § 371 of PCT International Application No. PCT/SE2018/051053, which has an International Filing Date of Oct. 17, 2018 and that claims priority to European Patent Application No. 171970601, filed Oct. 18, 2017. The entire contents of each of which are hereby incorporated by reference.

TECHNICAL FIELD

The present invention relates to the area of sample preparation, and more specifically to a device which provides for fast and simple removal of matrix components from a biological sample. The invention also encompasses a method for removing matrix component(s) from biological samples such as urine.

BACKGROUND

The treatment of a complex biological sample to remove or at least reduce the presence of substances that may impact a subsequent measurement of an analyte in said sample is commonly known as sample preparation, or simply "sample prep" for short. The term is used with reference to various methods and equipment, including solid phase extraction (SPE), supported liquid extraction (SLE) and protein precipitation. When it comes to the analysis of small organic molecules, such as drugs, prodrugs, metabolites thereof etc., the main purpose for the sample prep is to provide purities sufficient for analysis by mass spectrometry (MS).

Solid phase extraction (SPE) is a chromatographic technique that is widely used for preconcentration of analytical samples, for purification of various chemicals, and for removal of toxic or valuable substances from aqueous solutions. However, though it is much used for certain applications, it turns out to be expensive and time-consuming when a less exact clean-up of a sample is required, such as in the routine testing of very large numbers of urine samples in order to detect illegal substances e.g. at various sport events.

Supported liquid extraction (SLE) uses water-immiscible solvents for analyte extraction, More specifically, the aqueous phase is commonly immobilized on an inert phase such as diatomaceous earth onto which the water-immiscible phase is loaded. After a short wait, the eluent is pushed or blown through the column, resulting in an inherently cleaner extract than other simple sample preparation techniques, such as protein precipitation or 'dilute and shoot' (D&S).

"Dilute and shoot" (D&S) is a relatively quick method with wide use in clinical as well as forensic applications. The principle of D&S is simply to dilute a sample then directly inject it e.g. onto a liquid chromatography-mass spectrometry (LC-MS) system.

By definition, D&S methods will inherently still include interfering components, though in lower concentrations than in the original samples due to the dilution factor. Consequently, dirty D&S extracts may increase the requirement for column maintenance and/or reduce the lifetime of the subsequently used liquid chromatography systems, and the low purity of the sample may also increase the processing time in an LC-MS system. Further, D&S is not even possible for certain analytes known to be "difficult" such as certain opioids, e.g. buprenorphine and norbuprenorphine.

U.S. Pat. No. 6,541,273 (Aventis) relates to the area of cartridges for use in solid phase extraction. More specifically, methods and apparatus are disclosed which are useful for detecting the presence of pesticides, such as pyrazoles including fipronil, in soil, water, blood, tissue, urine and other types of agricultural, medical or pharmaceutical samples. The apparatus comprises a column having a first opening for receiving a sample and a second opening for discharging an eluate, which column comprises a first separation zone containing amino-functional silica, a second separation zone containing activated carbon, a third separation zone containing magnesium-silica gel or silica gel and a fourth separation zone containing magnesium-silica gel or silica gel, whichever was not used in the third separation zone.

WO 2007/030847 relates to a packing material for a micro-adsorption column for drying and/or purifying dissolved organic or biological analytes such as toxins, antibiotics, vitamins, hormones, pesticides and the like, containing at least one desiccant, a micro-adsorption column filled with the same, and the use thereof. More specifically, the packing material contains magnesium sulphate and at least one further desiccant selected from the group comprising aluminium oxide, calcium chloride, calcium hydride, calcium oxide, calcium sulphate, potassium hydride, silica gel, copper sulphate, magnesium oxide, magnesium perchlorate, molecular sieves, sodium hydroxide, phosphorus pentoxide, sulphuric acid on silicate, phosphorus pentoxide on silicate, as well as 0.5 to 90 wt. % of a naturally occurring or synthetic carrier with a large internal surface area, such as zeolites, diatomaceous earths, bentonite, silicon dioxide or the like.

WO 2008/103828 (William Brewer) describes pipette tips for extraction, sample collection and sample clean up, such as clean-up of stomach contents and extraction of basic drugs from urine. More specifically, the pipette tip contains a screen or a filter at its narrow lower end to contain solid-phase sorbent and a barrier at its wide upper end. According to WO2008/103828, the mixing of solutions with sorbents results in a gel, i.e. a solution which is homogenous and therefore provides what is stated to be unsurpassed extraction efficiencies and rapid equilibrations. The particle size of the sorbent may be in the range of 50-200 um, which is small enough to provide efficient extraction but requires high pressure. In addition to high pressure sorbents, other sorbents are mentioned for the removal of unwanted sample matrices, such as immunoaffinity sorbents, ion exchangers and porous materials for molecular weight separations. Specific examples of sorbents are functionalized or non-functionalized styrene divinyl benzene, alumina (basic, acidic or neutral), florisil, small particle size silica gel, C8, Q18 and functionalized C8 or C18 material, $Na_2SO_4$, $MgSO_4$ or $CaSO_4$ (for drying), diatomaceous earth, Sephadex, and polyethylene.

Due to an increasing demand of rapid controls of chemicals, such as the use of legal or illegal drugs, there is a constant demand in this field of methods for sample clean-up, which are improved in terms of speed, simplicity and/or cost.

SUMMARY OF THE INVENTION

One objective of the present invention is to reduce the complexity of biological samples by removing at least some of its matrix components more efficiently in a given period of time than at least some of the prior art.

More specifically, the invention relates to a flow-through device comprising at least one separation column wherein a first packing component, which comprises particles of alumina and/or silica, a second packing component, which comprises a powder of one or more hygroscopic salts are provided.

Further, another objective of the invention is to reduce the complexity of biological samples by a method which due to its simplicity in processing is suitable e.g. in routine testing of large numbers of samples.

More specifically, the invention relates to a method for removing one or more matrix components from a biological sample, wherein said matrix components are one or more selected from the group consisting of urea; uric acid; phospholipids; amino acids; creatine, heme degradation products such as urobillin; and endogenous salts, which method comprises passing said sample across a first packing component, which comprises particles of alumina and/or silica, a second packing component, which comprises a powder of one or more hygroscopic salts.

Finally, one other object of the invention is to provide for fast and simple analysis of drugs and other chemicals regardless of if they have been considered as 'problematic' in the prior art.

More specifically, the invention relates to the use of a combination of a first packing component, which comprises particles of alumina and/or silica, and a second packing component, which comprises a powder of one or more hygroscopic salts, for the removal of one or more matrix components from a biological sample.

Further details, embodiments and advantages of the present invention will appear from the detailed description, claims and other parts of the present invention.

Definitions

The term "a flow-through device" is used herein for a device capable of receiving liquid such as samples at the upper end, but not adapted for extraction from the lower end thereof.

The term "alumina" is used herein for $Al_2O_3$, which is also known as aluminium oxide or aluminum oxide.

The term "hygroscopic salts" is used herein for salts defined by the ability to absorb/adsorb water from said sample.

The term "packing" is used herein for any material used for separation, i.e. a material which is included in a column in order to separate a sample into fractions by adsorption and/or retention. Packing materials are known in this field under various terms, such as media, specifically chromatography media, sorbents, adsorbents or simply packings. The term "packing" is used herein for a content of a column regardless of how it has been provided therein, i.e. irrespective of whether it has been compressed or simply placed in the column.

The term "packing component" is used herein in order to more easily differentiate the different packings that are included in the device according to the invention. Thus, each packing component may be any conventional chromatography adsorbent such as exemplified in the present specification, such as silica; mixtures of magnesium sulphate and sodium sulphate etc.

Figure 3:
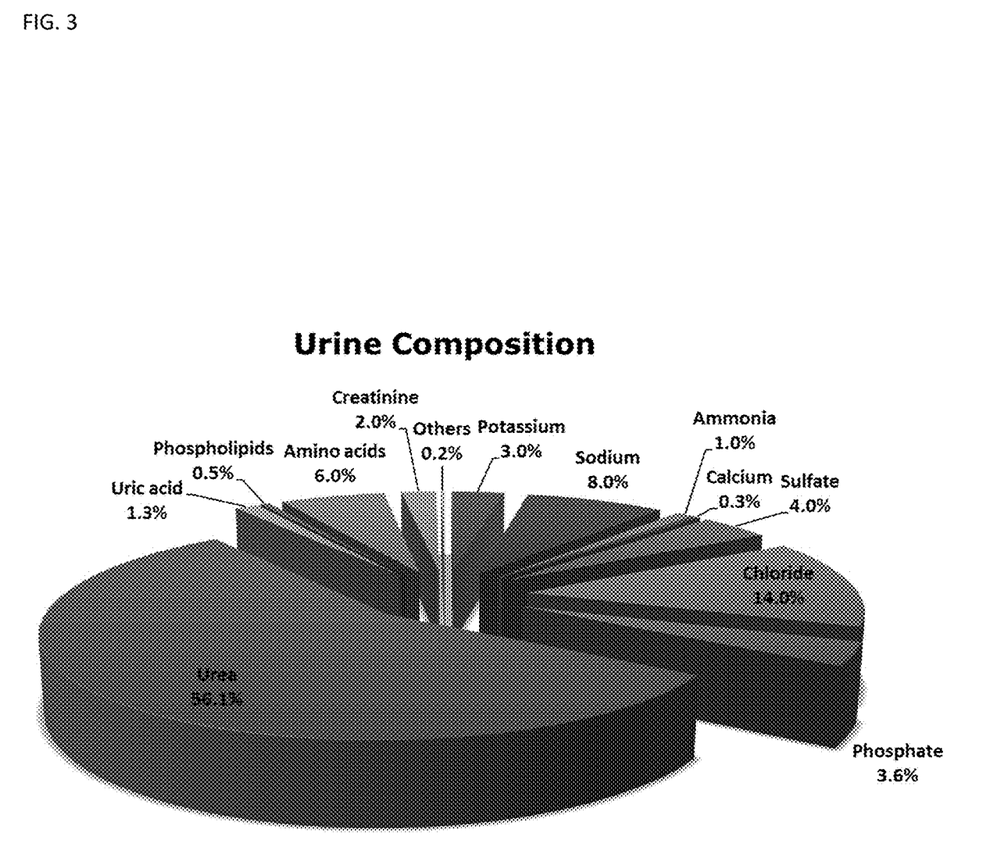
FIG. 3 is a chart demonstrating the composition i.e., the matrix components of normal urine.

The term "matrix component" is used herein in the sense commonly used in the area of sample preparation. Thus, the matrix of the sample includes constituents or components other than the analyte of interest. For example, a urine sample will include matrix components such as urea, phospholipids, amino acids and many others, as illustrated in FIG. 3, which all will be potentially problematic in the determination of an analyte and consequently should be removed during the sample preparation.

DETAILED DESCRIPTION OF THE INVENTION

A first aspect of the invention is a flow-through device comprising at least one separation column wherein a first packing component, which comprises particles of alumina and/or silica, and a second packing component, which comprises a powder of one or more hygroscopic salts are provided.

Alumina is a well-known separation media occurring in acidic, neutral or basic form and widely used to remove water from gas streams, but also as a sorbent for chromatography columns and other lab equipment. The skilled person may either obtain alumina from commercial sources, or purchase alumina and control its pH by the addition of base in water slurry.

Similarly, silica materials are widely used as sorbents for various separation and extraction purposes. For example, in solid phase extraction (SPE) silica materials functionalized e.g. with carbon are widely used, and such materials having carbon chains of any length between two and eighteen carbon atoms may be provided in the present device. Such materials are commonly referred to as "SPE phases".

In addition, other materials comprising lower proportions of silica may be provided as the first packing component in the present device, such as materials comprised of diatomaceous earth. These materials are commonly used in supported liquid extraction (SLE), and are therefore sometimes referred to as "SLE phases" and included herein within the term silica-comprising.

In the present device, the particles of the first packing component may be porous particles. More specifically, if alumina is present in the device according to the invention, it may have a particle size of at least about 10 μm and up to about 200 μm, and it may have a pore diameter in the range of 40-200 Å, such as about 120 Å.

Further, if silica materials are provided in the first packing component, they may have particle sizes in ranges equivalent to the above The particles of the first packing component may e.g. be spherical, or of any irregular shape.

Further, the first packing component may comprise acidic or neutral alumina. The skilled person may consider for a specific application which form to use depending for example on the expected capacity. For different matrices and potentially different analyte panels, neutral alumina may be more selective.

Further, if the first packing component comprises silica, it may advantageously be functionalized. Suitable functions may e.g. be any one or ones those commonly used in SPE phases. For example, functionalized silica may include one or more of the functionalities from the group consisting of carbon chains, such as linear C4-C18 chains; carboxylic groups; metal chelating groups, and ion-exchanging groups, such as cation exchangers or anion exchangers.

In addition, the first packing component may comprise endcapped silica, which is often provided as an SPE phase. In brief, the capping therein refers to the capping of free silanol groups.

Without wishing to impose any limitation to the invention as defined by the appended claims, the first packing component appears when combined with a solvent such as acetonitrile (ACN) provide a precipitation that removes certain matrix components, such as urinary salts, due to lower solubility in the solvent. The contacting of the sample with the first packing component also appears to remove some pigment, which has been difficult to remove using prior art methods.

Thus, in the present device, the second packing component is used to in practise 'dry out' the sample, while in the prior art, hygroscopic salt(s) of the herein discussed sorts are commonly used to 'salt out' an analyte from one phase to another. Consequently, by the combining the powder of hygroscopic salt(s) with alumina and/or silica particles, the device according to the invention provides unexpectedly efficient and fast removal of matrix components from biological samples. Specifically, as shown in the Experimental part below, the present invention has been shown to efficiently remove even the more difficult matrix components from urine and other samples.

More specifically, the powder of hygroscopic salt(s) may e.g. comprise one or more selected from the group consisting of magnesium sulphate; sodium sulphate; sodium acetate, sodium citrate; sodium citrate sesquihydrate; sodium chloride; and magnesium oxide. Other salts could be used as well, provided they achieve the above-discussed effect of the second packing component. Salts useful in the second packing components may be known as drying agents, or simply referred to as anhydrous salts.

Inorganic salts such as magnesium sulphate ($MgSO_4$) and sodium acetate (NaOAc, i.e. $CH_3COONa$) are commercially available under the trade name QuEChERS (http://www.restek.com/). Thus, the skilled person may obtain the second packing component from commercial sources, or prepare it from the separate chemicals. In the device according to the invention, the second packing component is such a blend of magnesium sulphate and sodium acetate which may be in powder form, and the ratio may vary e.g. from 1 to 4 to about 4 to 1.

In an advantageous format, the device of the invention includes no more than two packing components, wherein a first packing component comprises silica; and a second packing component comprises magnesium sulphate and sodium acetate. The two packing components may be provided as separated layers, or as a mixture, as will be discussed elsewhere in this specification.

In the device according to the invention, the column may comprise a bottom frit and a top frit at opposite sides of the first packing component and the second packing component. In other words, viewing the device in flow-through mode, the upper frit is arranged upstream of the two packing components while the lower frit is arranged downstream of the two packing components. In this context, the term "frit" is used for any suitable divider, such as a filter, mesh or the like, which is capable of maintaining the two packing components in the column while liquids are allowed to pass. Such a frit may either be able to adsorb liquid; or be prepared as a mesh which is not capable of liquid adsorption at all, or only to a very little degree, in order to reduce the dead volume especially of small devices. As the skilled person will appreciate, all frits considered in the present device are able to allow liquid to pass during sample processing.

In one embodiment of the present device, the first packing component and the second packing component are provided as separate layers in the column. The first packing component is then provided closer to the top frit, i.e. upstream of the second packing component and the bottom frit, as illustrated in FIGS. 1B and 2B.

Figure 1A:
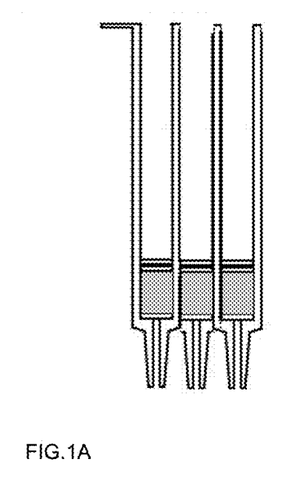
FIGS. 1A and 1B show a device according to the invention, which comprises a plurality of tubes arranged in a plate format in blended and layered format, respectively.
Figure 1B:
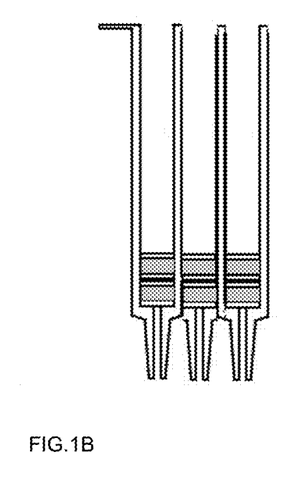
Figure 2A:
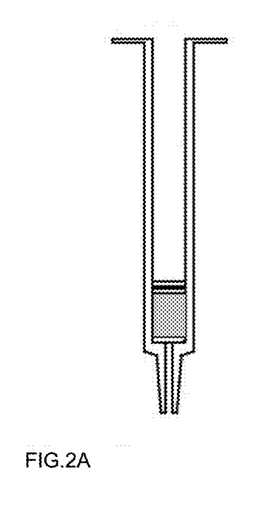
FIGS. 2A and 2B show a device according to the invention, which comprises a single bed i.e. single tube format in blended and layered format, respectively.
Figure 2B:
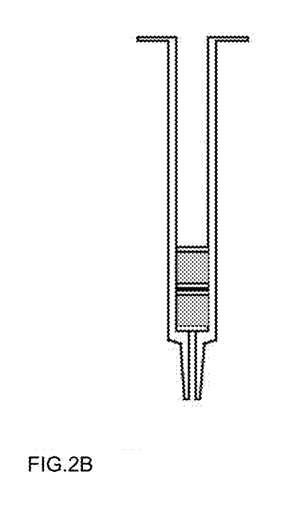

In order to provide for a clear separation of the layers, the first packing component and the second packing component may be separated by a middle frit, also as illustrated in FIGS. 1B and 2B. All features discussed above regarding the first and the second packing components are applicable to this embodiment.

In an alternative embodiment, the first packing component and the second packing component are provided as a blend in the column, as illustrated in FIGS. 1A and 2A. Suitable blending ratios may e.g. be from 1:4 to 4:1 blend of alumina and/or silica particles:hygroscopic salts. All features discussed above regarding the first and the second packing components are applicable to this embodiment.

The device according to the invention may be in a single bed format, in which case the column is a tube, a chromatography column or any other suitable barrel shaped container. All features discussed above regarding the two packing components and how they are blended or layered are applicable to this embodiment.

Alternatively, the device according to the invention may be in a multi-bed format, in which case two or more, such as a plurality of columns, are arranged in a plate, e.g., as the fixed wells of a plate, such as a multiwall plate, or tubes or vials in a rack. All features discussed above regarding the two packing components and how they are blended or layered are applicable to this embodiment.

As appears from other sections of this application, the device according to the invention is advantageously used for the removal of matrix components from biological samples.

Thus, in one embodiment, the device according to the invention may comprise a hydrophobic top frit arranged upstream of the first packing component and the second packing component. All the device features discussed above such as the nature of the two packing components, the blend/layering thereof in a column and the formats may be combined with such a top frit within the scope of the invention.

A second aspect of the invention is a method for removing one or more matrix components from a biological sample, wherein said matrix components are one or more selected from the group consisting of urea; uric acid; phospholipids; amino acids; creatine, heme degradation products such as urobillin; and endogenous salts. The method according to the invention comprises passing said sample across a first packing component, which comprises particles of alumina and/or silica, and a second packing component, which comprises a powder of one or more hygroscopic salts.

The nature of the two packing components, the blend/layering thereof in a column and the illustrative formats discussed above may be applied within the scope of the method according to the invention.

The biological sample may be any sample the complexity of which needs to be reduced for a subsequent successful analysis of an analyte. In this context, the term "biological" is understood as originating from a mammal, such as a human being or an animal, or any other biological source. The biological sample may be a biological liquid, such as urine or saliva.

The matrix components removed from the sample may e.g., be any one or more selected from the group consisting of urea; uric acid; phospholipids; amino acids; creatine, heme degradation products such as urobillin; and endogenous salts; which are all urine components known to interfere with analytic methods such as MS.

Alternatively, the biological sample may comprise a liquefied or mechanically finely divided tissue, such as a biopsy or other tissue originating from a human being or an animal.

More specifically, and as will be illustrated in more detail in the experimental part below, a method according to the invention may encompass a simple workflow where e.g. raw urine, which may or may not have been hydrolysed, is diluted with a suitable solvent, such as acetonitrile. The resulting liquid is added to a column, such as a device according to the invention, positive pressure is applied in accordance to any well-known technology and an extract is collected. The resulting extract may then be evaporated and reconstituted in a solvent suitable for LC-MS, or even be directly injected onto the LC-MS.

In an advantageous method according to the invention, the biological sample is hydrolysed before it is passed across the two packing components. This may be achieved e.g., by passage thereof across a hydrophobic frit.

A third aspect of the invention is the use of a combination of a first packing component, which comprises particles of alumina and/or silica, and a second packing component, which comprises a powder of one or more hygroscopic salts for the removal of one or more matrix components from a biological sample.

All details provided in this application regarding the nature of the two packing components, the blend/layering thereof in a column, the illustrative formats and the method may be applied in any combination or embodiment within the scope of the present use.

The use according to the invention is advantageous for the purpose of removing matrix components from any biological sample, such as samples taken from individuals in order to identify or trace the use of drugs, biomarkers, metabolites etc. For example, the invention may be used e.g. in routine controls for the identification of individuals using illegal drugs, such as drugs that improve physical performance (dopants) during sport events. It may also be used to track drugs of abuse, and/or metabolites formed as a result of legal or illegal intake of chemical substances. Thus, the analyte targeted in e.g. MS subsequent to the present invention could e.g. be selected from the group consisting of amphetamines; opiates; cocaines; benzodiazepines: barbiturates; nonbenzodiazepine drugs known as z drugs; tetrahydrocannabinol (THC); steroids; and related metabolites.

In an advantageous use according to the invention, at least one matrix component removed is a pigment and the sample is urine.

DETAILED DESCRIPTION OF THE DRAWINGS

FIGS. 1A and 1B illustrate the principles of a device according to the invention, which comprises a plurality of tubes arranged in a plate format: FIG. 1A shows how the two packing components are blended to provide a single bed format in each tube; while FIG. 1B shows the two packing components separated and into a layered format having the second packing component i.e., the hygroscopic salt(s) as the bottom layer and the first packing component i.e., alumina and/or silica as the top layer, and the layers separated by a frit.

FIGS. 2A and 2B illustrate the principles of a device according to the invention, which comprises a single bed clean up format: FIG. 2A shows how the two packing components are blended to provide a single bed format; while FIG. 2B shows a layered format having the second packing component i.e., the hygroscopic salt(s) as the bottom layer and the first packing component i.e. the alumina and/or silica as the top layer, where the layers are separated by a frit.

FIG. 3 demonstrates normal urine composition. The majority (56.1%) of the matrix is made up of urea with various salts, small organic acids, creatinine making up the smaller proportions. From left to right the chart shows the proportion of: uric acid 1.3%, phospholipids 0.5%, amino acids 6%, creatinine 2%, others 0.2%, potassium 3%, sodium 8%, ammonia 1%, calcium 0.3%, sulphate 4%, chloride 14% and phosphate 3.6%.

Figure 4A:
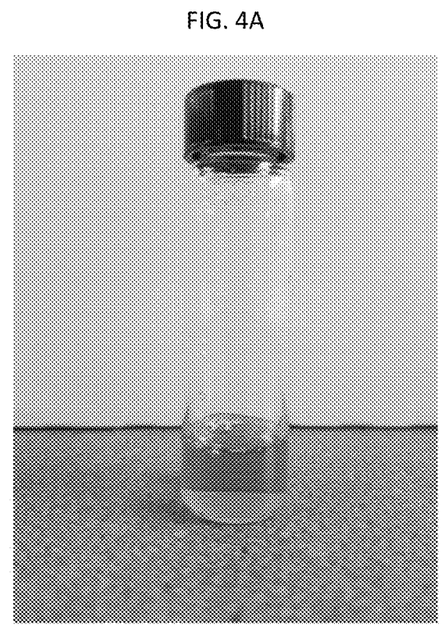
FIGS. 4A and 4B demonstrate raw hydrolysed urine without further processing on the left (4A) and the resulting eluate after processing with the said flow through device on the right (4B).
Figure 4B:
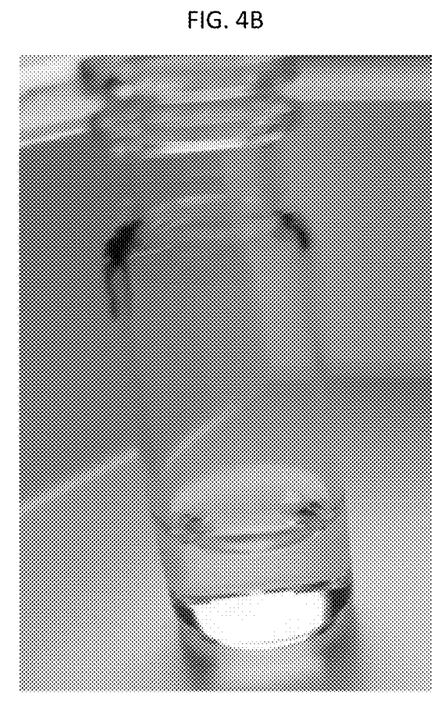

FIGS. 4A and 4B demonstrate raw hydrolysed urine without further processing on the left and the resulting eluate after processing with the said flow through device on the right. It can be seen that when using the said flow through device full removal of the matrix pigment is achieved resulting in a clear liquid.

Figure 5A:
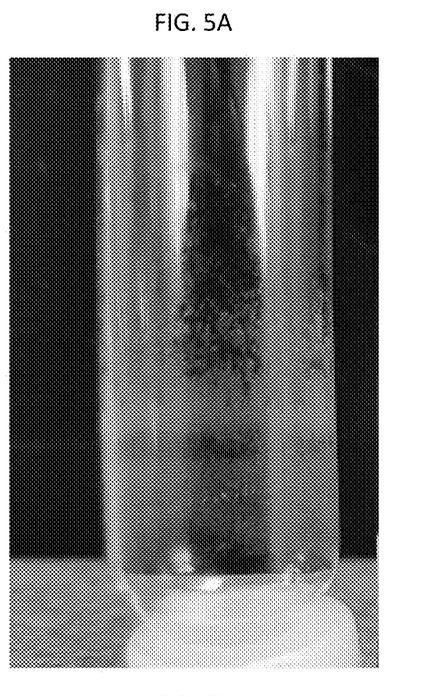
FIGS. 5A and 5B demonstrate hydrolysed urine extract cleanliness in terms of pigment and salt removal, the left culture tube detailing precipitated urine followed by centrifugation and the eluate removed and evaporated; while the culture tube on the right details the same sample processed according to the invention.
Figure 5B:
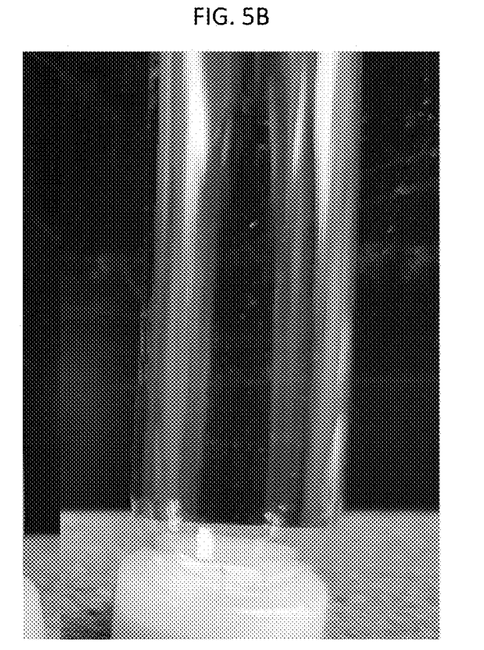

FIGS. 5A and 5B demonstrate hydrolysed urine extract cleanliness in terms of pigment and salt removal. Visual extracts shown are from evaporated samples. The left culture tube details precipitated urine followed by centrifugation and the eluate removed and evaporated; the culture tube on the right details the same sample processed using the said flow through device followed by eluate evaporation. Substantial residue and pigment is demonstrated on the left culture tube whereas a clear tube is shown on the right.

Figure 6A:
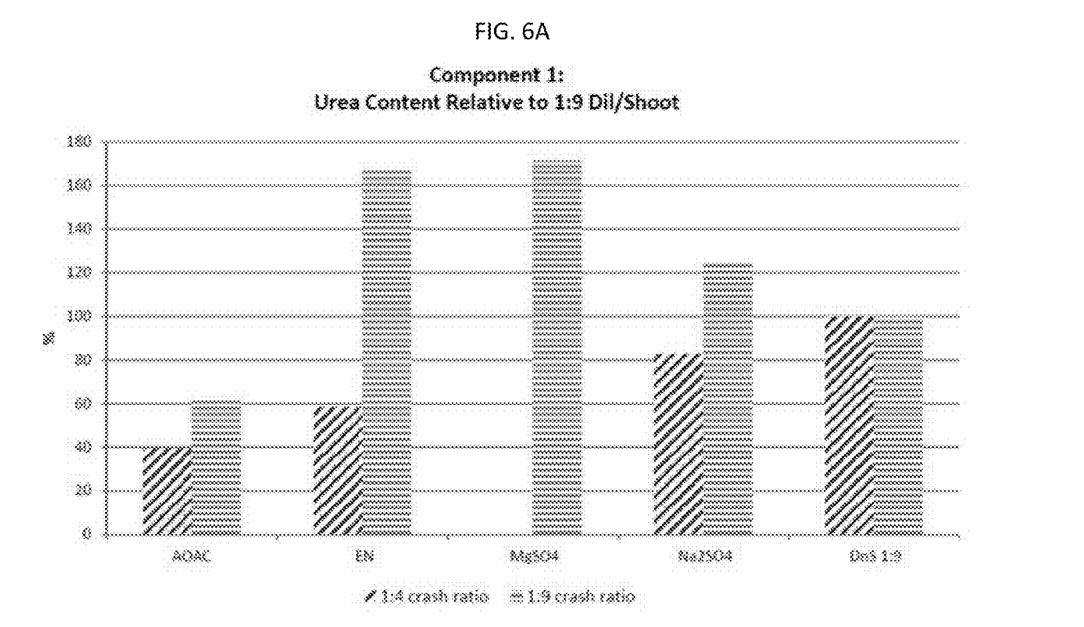
FIGS. 6A and 6B demonstrate bar chart comparisons of urea (a—top chart) and creatinine (b—bottom chart) content for a given non-hydrolysed urine sample varying component 1.
Figure 6B:
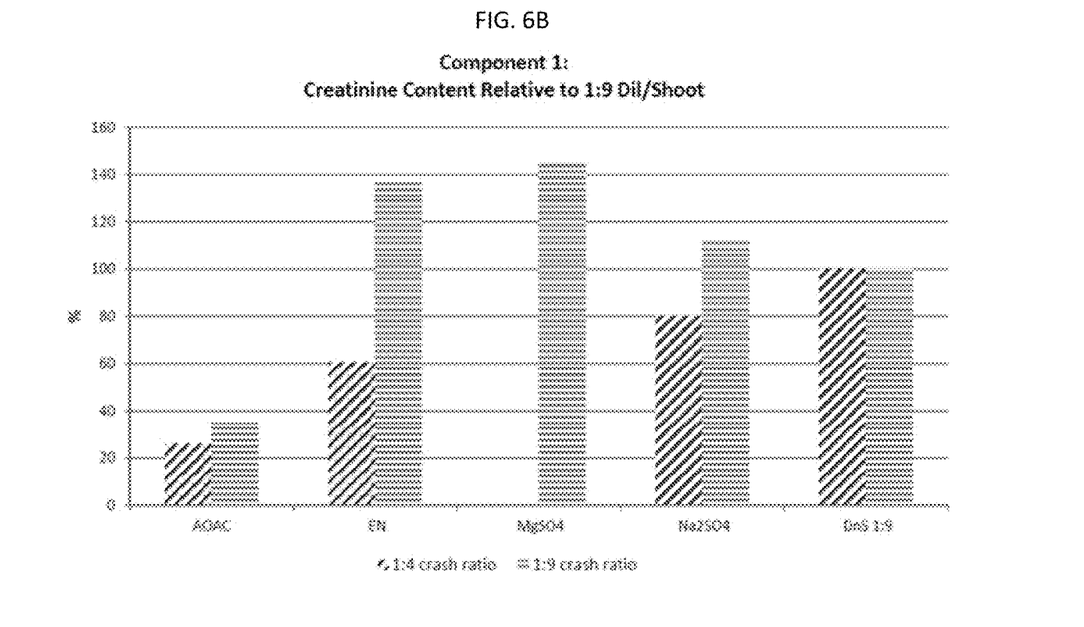

FIGS. 6A and 6B demonstrate bar chart comparisons of urea (a—top chart) and creatinine (b—bottom chart) content for a given non-hydrolysed urine sample varying packing component 1. Extracts using modified hygroscopic salt combinations were compared to a dilute and shoot approach. The options from left to right: AOAC QuEChERs salts; EN QuEChERs salts; $MgSO_4$ only; $Na_2SO_4$ only; 1:9 dilute and shoot. Urine crash ratios of 1:4 (diagonal pattern) and 1:9 (horizontal pattern) with ACN are detailed. Various QuEChERs salt combinations performed more reliably compared to single salt formats.

Figure 7:
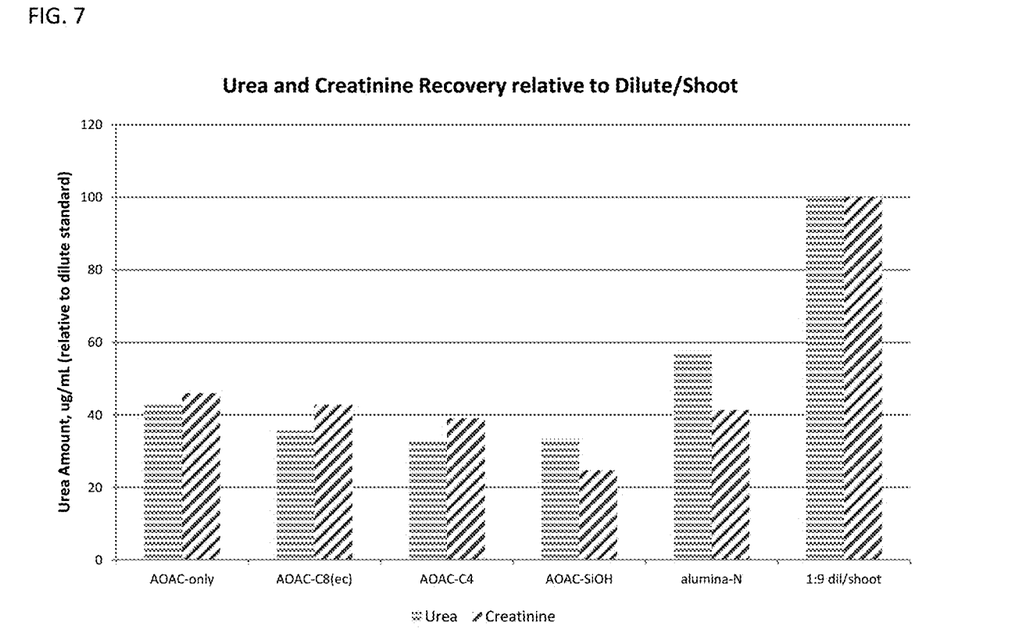
FIG. 7 demonstrates a bar chart comparison of urea (horizontal pattern) and creatinine (diagonal pattern) content for a given non-hydrolysed urine sample varying component 2 with combinations of component 1.

FIG. 7 demonstrates a bar chart comparison of urea (horizontal pattern) and creatinine (diagonal pattern) content for a given non-hydrolysed urine sample varying packing component 2 with combinations of packing component 1. The options from left to right: AOAC salts only; layered C8-End capped above AOAC salts; layered C4 above AOAC salts; layered Si above AOAC salts; alumina-N only; 1:9 dilute and shoot. When using various modified silica sorbents only slight improvement was observed compared to using packing component 1 only. Using Alumina alone provided>40% removal while also eliminating pigment from the sample.

Figure 8:
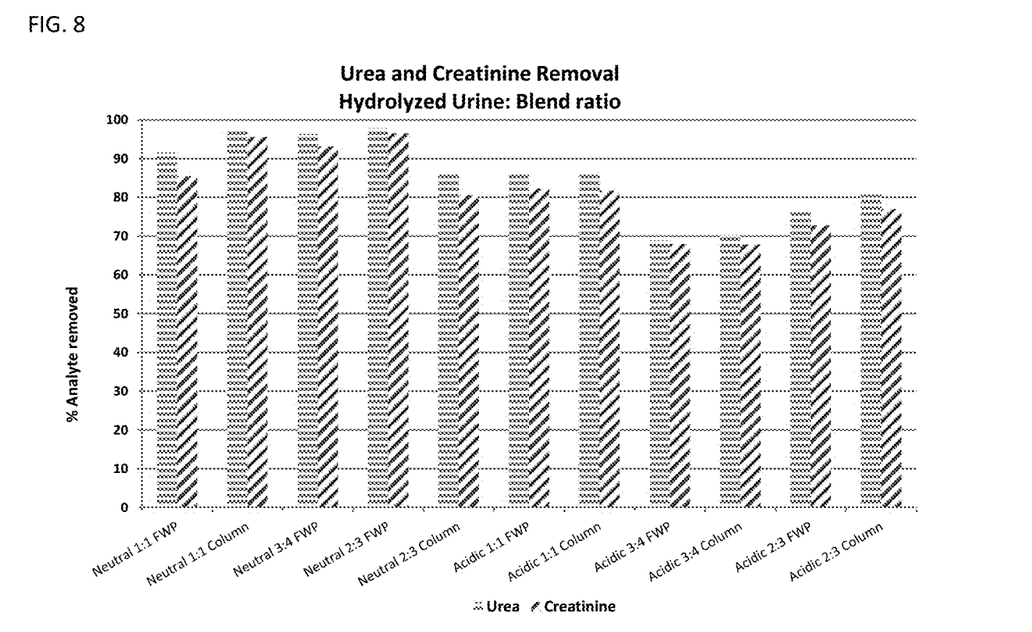
FIG. 8 demonstrates a bar chart comparison of urea (horizontal pattern) and creatinine (diagonal pattern) removal for a given hydrolysed urine sample when blending various ratios of alumina (acidic and neutral) with hygroscopic salts in 96 well plate and individual column format.

FIG. 8 demonstrates a bar chart comparison of urea (horizontal pattern) and creatinine (diagonal pattern) removal for a given hydrolysed urine sample when blending various ratios of alumina (acidic and neutral) with hygroscopic salts in 96 well plate and individual column format. The options from left to right: Al—N/salt 1:1 plate; Al—N/salt 1:1 column; Al—N/salt 3:4 plate; Al—N/salt 2:3 plate; Al—N/salt 2:3 column; Al-A/salt 1:1 plate; Al-A/salt 1:1 column; Al-A/salt 3:4 plate; Al-A/salt 3:4 column; Al-A/salt 2:3 plate; Al-A/salt 2:3 column. Good creatinine and urea removal was observed with various ratios.

Figure 9A:
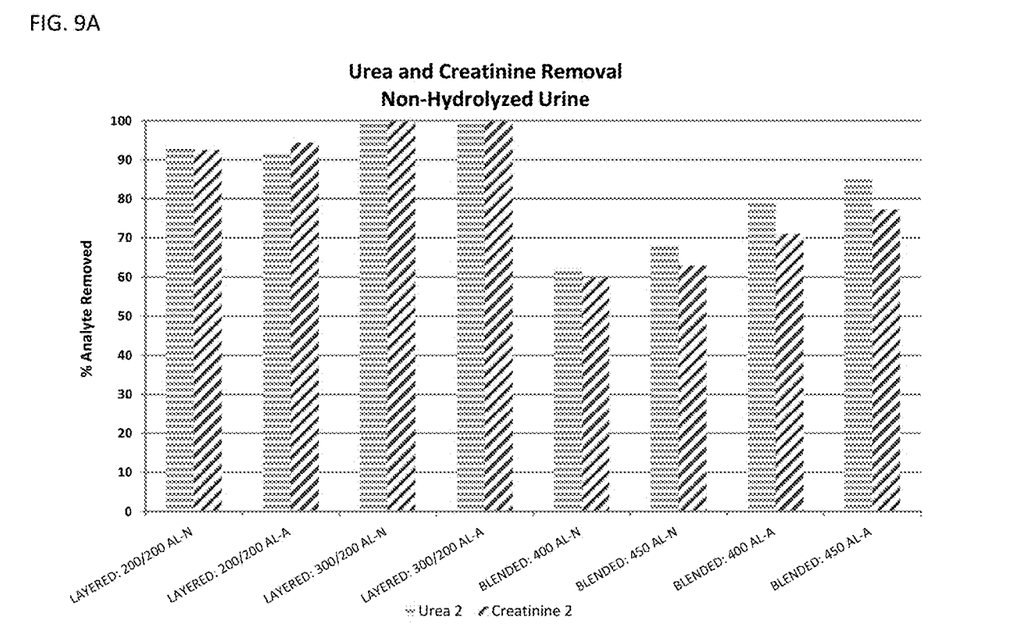
FIGS. 9A and 9B demonstrate bar chart comparisons of urea (horizontal pattern) and creatinine (diagonal pattern) removal for a given non-hydrolysed (top chart) and hydrolysed urine sample (bottom chart) using layered vs blended alumina/hygroscopic salt combinations.
Figure 9B:
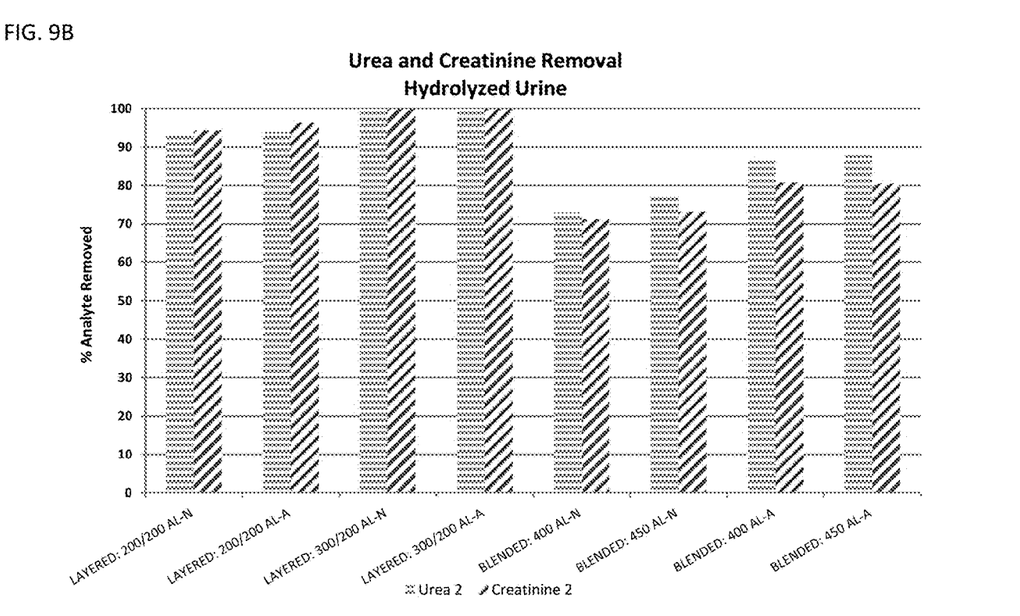
Figure 10A:
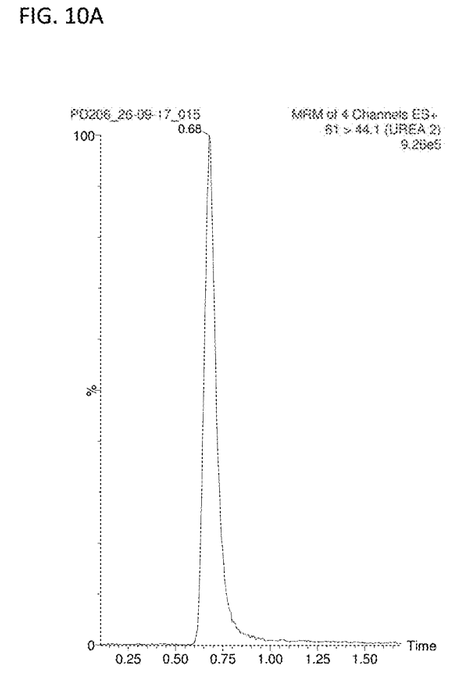
FIGS. 10A, 10B, 10C and 10D demonstrate LC-MS/MS TICs of urea (top traces) and creatinine (bottom traces) removal for a given hydrolysed urine sample. The traces on the left demonstrate a simple precipitation with ACN and traces on the right are using the said flow through device.
Figure 10B:
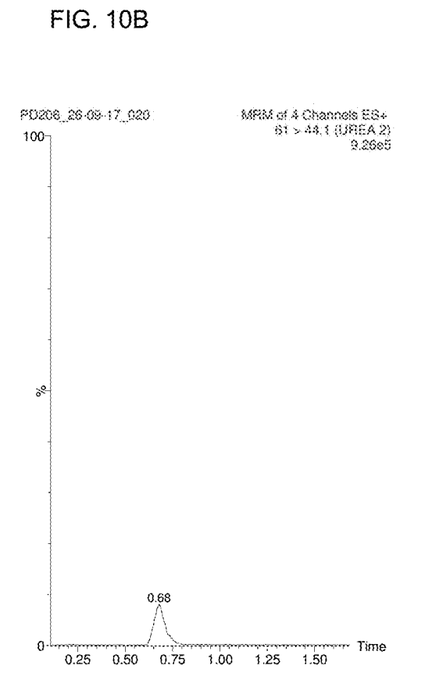
Figure 10C:
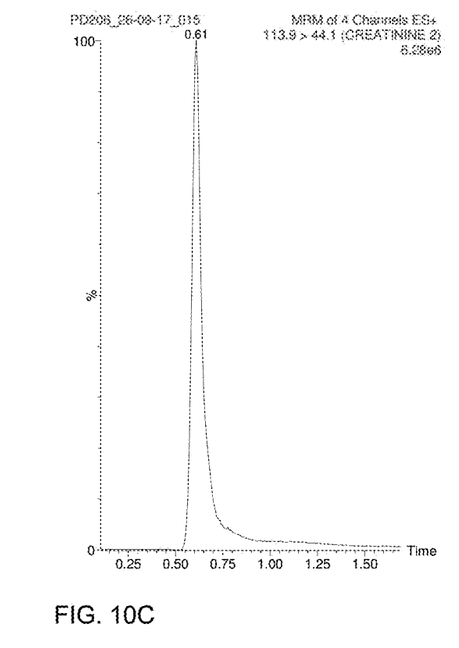
Figure 10D:
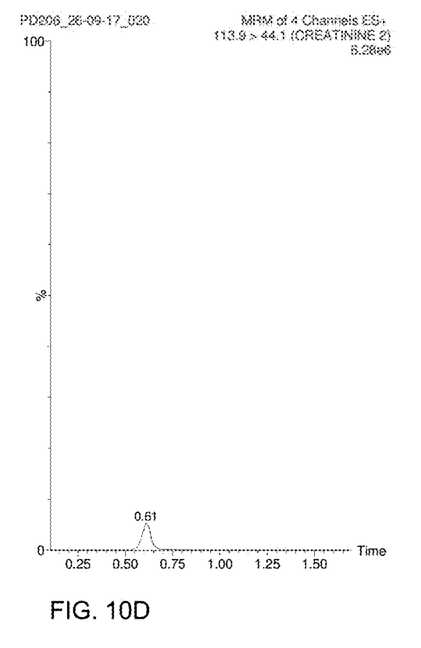

FIGS. 9A and 9B demonstrate bar chart comparisons of urea (horizontal pattern) and creatinine (diagonal pattern) removal for a given non-hydrolysed (top chart) and hydrolysed urine sample (bottom chart) using layered vs blended alumina/hygroscopic salt combinations. Both charts demonstrate various options from left to right: Layered plate 200/200 salt/Al—N; 200/200 salt/Al-A; 300/200 salt/Al—N; 300/200 salt/Al-A; Blended plate 400 mg salt/Al—N; 450 mg salt/Al—N; 400 mg salt/Al-A; 450 mg salt/Al-A. The comparison of layered vs blended formats demonstrate better creatinine and urea removal with the layered format while acidic alumina is also slightly better than the neutral equivalent.

FIGS. 10A, 10B, 10C and 10D demonstrate LC-MS/MS TICs of urea (top traces FIGS. 10A and 10B) and creatinine (bottom traces FIGS. 10C and 10D) removal for a given hydrolysed urine sample. The traces on the left demonstrate a simple precipitation with ACN and traces on the right are using the said flow through device. High level of urea and creatinine removal was observed, typically greater than 90% when using the said flow through device compared to conventional processing.

Figure 11A:
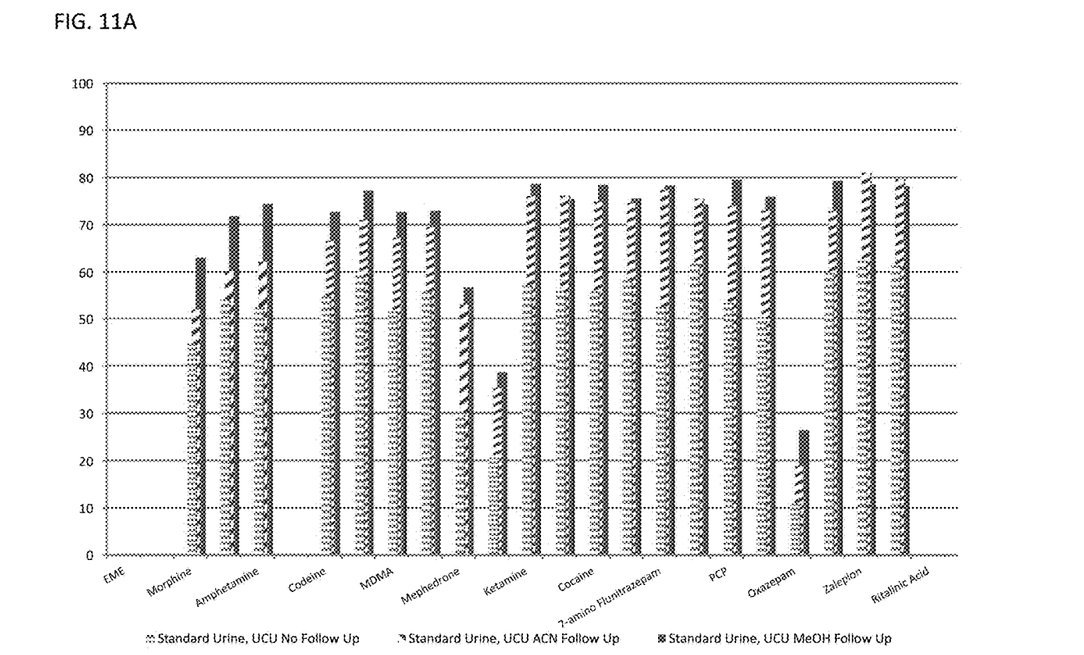
FIGS. 11A and 11B demonstrate bar chart recoveries from non-hydrolysed urine for a range of drugs of abuse obtained using the various protocols with the said flow through device.
Figure 11B:
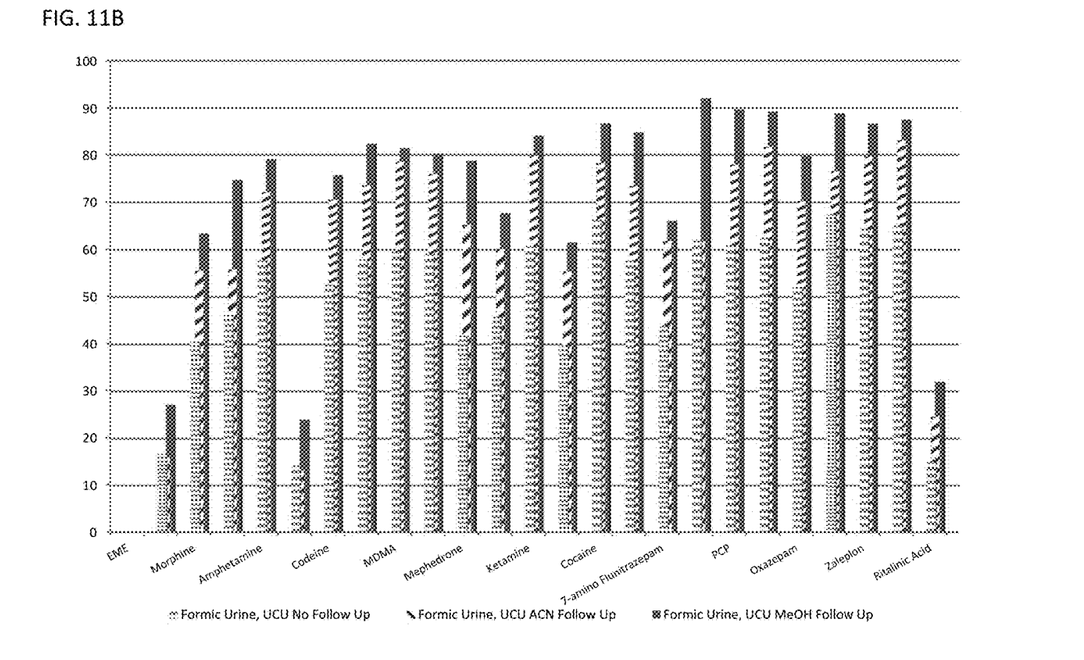

FIGS. 11A and 11B demonstrate bar chart recoveries from non-hydrolysed urine for a range of drugs of abuse obtained using the various protocols with the said flow through device, where the bars represent, starting from the left: morphine, amphetamine, codeine, MDMA, mephedrone, ketamine, cocaine, 7-amino flunitrazepam, PCP, oxazepam, zaleplon and ritalinic acid. The top chart (11A) details the standard method as detailed in the experimental section at the front with horizontal pattern; modification by addition of ACN as a further small aliquot in the middle with diagonal pattern; modification by addition of MeOH as a further small aliquot at the back with solid pattern. The bottom chart (11B) repeats the trend using urine modified with formic acid prior to extraction as detailed in the experimental section.

EXPERIMENTAL

The present examples are provided for illustrative purposes only, and should not be interpreted as limiting the present invention as defined by the appended claims. All references provided below or elsewhere in the present application are hereby included herein by reference.

Materials and Methods

Drug standards and associated internal standards were purchased from LGC Standards (Teddington, UK). Ammonium acetate, ammonium hydroxide, HCl, formic and acetic acids and β-glucuronidase (*Helix pomatia*) were purchased from Sigma-Aldrich Company ltd (Gillingham, UK). Urine was donated by healthy human volunteers. All solvents were LC/MS grade from Honeywell Research Chemicals (Bucharest, Romania). Water (18.2 MΩ·cm) was drawn fresh daily from a Direct-Q 5 water purifier (Merck Millipore, Watford, UK).

Hydrolysed Urine Procedure 1 mL of urine (blank or spiked) was diluted with 950 µL of 100 mM ammonium acetate pH 5 and 50 µL β-glucuronidase enzyme (equivalent to approximately 4500 U/mL of urine). Urine was hydrolysed at 60° C. for up to 2 hours then cooled prior to further processing. Alternative hydrolysis procedures will also work using various recombinant and non-recombinant enzymes. When using the proprietary treated hydrophobic frits the hydrolysis procedure can be performed on plate.

Urine Extraction Procedure

Non-hydrolysed or enzymatically hydrolysed urine (as above example), typically 100 µL is thoroughly mixed with 600 µL of ACN. Mixing can be performed offline in Eppendorf tubes or other suitable container or on-plate both using vortex action (20 seconds) or by repeat aspirate/dispense pipetting (3-4 cycles).

Larger urine volumes are also possible.

If processing offline in tubes these can be centrifuged for 10 minutes at 13,300 rpm to remove particulate matter. For on-plate processing the centrifugation step is not required due to adequate filtering capacity of the frit components.

Apply the supernatant to the said flow through device if using offline processing.

Apply positive pressure or vacuum to initiate flow. Flow recommendations will be different between the said flow-through device when using standard type top frits as opposed to using the proprietary treated hydrophobic top frits. Typical processing should use subtle conditions potentially ramping pressure or vacuum towards the end of the processing. Example processing could be: 1 PSI for 10 seconds, 3 PSI for 10 seconds, 5 PSI for 10 seconds and then 10 PSI for 10 seconds.

The eluate can then be evaporated and reconstituted in appropriate mobile phase for LC/MS analysis. If chromatographic conditions and method sensitivity allow the eluate can be directly injected onto the LC/MS system with or without dilution with water.

Method Optimization Strategies

For difficult analytes, including some amphoteric analytes such as gabapentin and pregabalin and to increase recovery of some other drugs additional steps can be included:

Addition of 10 µL of formic acid to urine sample directly prior to mixing with ACN.

Post flow though of the sample/ACN mixture a further aliquot of organic solvent such as ACN or MeOH can increase recoveries. Here 100-200 µL can be effective. Processing should be performed using the previously stated vacuum or positive pressure procedure.

The invention claimed is:

1. A flow-through device comprising:
   at least one separation column including
      a first packing component, the first packing component including particles of at least one of alumina or silica, and
      a second packing component at least partially downstream of at least a portion of the first packing component, the second packing component including particles of magnesium sulphate and at least one of sodium sulphate, sodium acetate, sodium citrate, sodium citrate sesquihydrate, sodium chloride, or magnesium oxide.

2. The flow-through device of claim 1, wherein the second packing component includes a mixture of magnesium sulphate and sodium chloride.

3. The flow-through device of claim 1, wherein the silica of the first packing component includes functionalized silica.

4. The flow-through device of claim 1, wherein the first packing component includes silica and the second packing component includes a mixture of magnesium sulphate and sodium chloride.

5. The flow-through device of claim 1, wherein the at least one separation column further includes at least one of a bottom frit or a top frit.

6. The flow-through device of claim 5, wherein the at least one separation column includes at least the top frit, and the top frit is a hydrophobic frit.

7. The flow-through device of claim 1, wherein the first packing component is included in a first packing layer and the second packing component is included in a second packing layer separate from the first packing layer.

8. The flow-through device of claim 7, wherein the first and second packing layers are separated by a middle frit.

9. The flow-through device of claim 1, wherein the first and second packing components are blended.

10. The flow-through device of claim 1, wherein the at least one separation column includes a plurality of separation columns.

11. The flow-through device of claim 10, wherein the plurality of separation columns are filter wells in a plate.

12. The flow-through device of claim 1, wherein the at least one separation column is configured such that the first packing component removes precipitates from a solution and the second packing component dry outs the solution passed through the first packing component.

13. The flow-through device of claim 1, wherein the particles of the first packing component have at least one of a diameter in a range of 10 micrometers to 200 micrometers or a pore diameter in the range of 40 Å to 200 Å.

14. A method of using the flow device of claim 1 comprising:
   preparing a solution for purification by mixing a biological sample with a solvent;
   passing the solution through the at least one separation column such that the first packing component removes precipitates from the solution and the second packing component dry outs the solution passed through the first packing component; and
   collecting the solution passed through the second packing component.

15. The method of claim 14, wherein the solvent is acetonitrile.

16. The method of claim 14, wherein passing the solution through the at least one separation column includes applying at least one of a vacuum or a positive pressure to the at least one separation column.

17. The method of claim 14, further comprising:
   hydrolyzing the biological sample before removing the precipitates.

18. The method of claim 17, wherein the hydrolyzing the biological sample includes passing the solution through a hydrophobic frit.

19. The method of claim 14, wherein the biological sample includes urine.

20. The method of claim 14, wherein the precipitates include one or more of urea, uric acid, phospholipids, amino acids, creatine, heme degradation products, or endogenous salts.

* * * * *